United States Patent
Gurusamy et al.

(10) Patent No.: US 8,483,689 B2
(45) Date of Patent: Jul. 9, 2013

(54) METHOD AND SYSTEM FOR MANAGING A MOBILE DEVICE HANDOFF FROM A MACRO BASE STATION TO A FEMTO BASE STATION

(75) Inventors: Lakshmi Praba Gurusamy, Bangalore (IN); Surekha Biruduraju, Bangalore (IN)

(73) Assignee: Samsung Electronics Co., Ltd (KR)

( * ) Notice: Subject to any disclaimer, the term of this patent is extended or adjusted under 35 U.S.C. 154(b) by 121 days.

(21) Appl. No.: 13/132,267

(22) PCT Filed: Nov. 13, 2009

(86) PCT No.: PCT/KR2009/006691
§ 371 (c)(1),
(2), (4) Date: Jun. 1, 2011

(87) PCT Pub. No.: WO2010/064795
PCT Pub. Date: Jun. 10, 2010

(65) Prior Publication Data
US 2011/0244861 A1    Oct. 6, 2011

(30) Foreign Application Priority Data

Dec. 1, 2008   (IN) .......................... 3025/CHE/2008

(51) Int. Cl.
H04W 36/08    (2009.01)
(52) U.S. Cl.
USPC .......................................... 455/436; 455/437
(58) Field of Classification Search
USPC .................. 455/436, 437, 444; 370/252, 331
See application file for complete search history.

(56) References Cited

U.S. PATENT DOCUMENTS

| 6,600,924 | B1 | 7/2003 | Sinivaara et al. |
| 2002/0151308 | A1 | 10/2002 | Baba et al. |
| 2010/0113032 | A1* | 5/2010 | Lee et al. ..................... 455/437 |

FOREIGN PATENT DOCUMENTS

| KR | 1020090112337 | 10/2009 |
| WO | WO 2008103084 | 8/2008 |

OTHER PUBLICATIONS

PCT/ISA/237 Written Opinion issued on PCT/KR2009/006691 (5 pp.).
PCT/ISA/210 Search Report issued on PCT/KR2009/006691 (3 pp.).

* cited by examiner

*Primary Examiner* — Sam Bhattacharya
(74) *Attorney, Agent, or Firm* — The Farrell Law Firm, P.C.

(57) ABSTRACT

A method for managing a mobile device handoff from a macro base station to a Femto Base Station includes receiving periodically a subscriber list from each of neighboring Femto Base Stations by the Macro Base Station. The method also includes storing Femto Base Station information and corresponding subscriber list and establishing connection with the mobile device. Further, the method includes identifying the mobile device to a corresponding Femto Base Station. The method includes transmitting a unicast message to the mobile device. Furthermore, the method includes receiving a scan request by Macro Base Station from the mobile device and sending scan response by the Macro Base Station to the mobile device. Further, the method includes receiving a handoff request from the mobile device and sending a handoff response to the mobile device. The system includes a macro base station for receiving periodically a subscriber list from neighboring Femto Base Stations.

6 Claims, 6 Drawing Sheets

METHOD AND SYSTEM FOR MANAGING A MOBILE DEVICE HANDOFF FROM A MACRO BASE STATION TO A FEMTO BASE STATION

PRIORITY

This application claims priority to International Patent Appl. No.: PCT/KR2009/006691 filed Nov. 13, 2009, and to Indian Patent Application No. 3025/CHE/2008 filed Dec. 1, 2008, the disclosure of each of which is incorporated herein by reference.

TECHNICAL FIELD

The present disclosure relates generally to the field of wireless communication and more particularly to the field of a method and system for managing a mobile device handoff from a macro base station to a femto base station.

BACKGROUND ART

Macro base stations are used in high performing cells and provide a large coverage area. A femto base station is installed at a home or at office to provide better service and covers a small area. In the existing scenario, the macro based station advertises information of a large number of neighbor base stations to the mobile device. This increases the air interface signaling in the network. The mobile device then searches for a corresponding home femto base station from the information. The search process becomes tedious and leads to battery drainage in the mobile device.

DISCLOSURE OF INVENTION

Technical Problem

Another existing scenario describes the change of mobile device functionality to maintain mapping between overlay Macro Base Station and femto base station in a non volatile memory. Since mobile node functionality is changed, already existing mobile devices cannot perform seamless handover. Also if Femto Base Station is changed from one location to another location, mapping at Mobile device becomes invalid and seamless handover is not possible.

In light of the foregoing discussion there is a need for an efficient technique for managing a mobile device handoff from a macro base station to a femto base station.

Solution to Problem

Embodiments of the present disclosure described herein provide a method and system for managing a mobile device handoff from a macro base station to a femto base station.

An example of a method for managing a mobile device handoff from a macro base station to a femto base station includes receiving periodically a subscriber list from each of neighboring Femto Base Stations by the Macro Base Station. The method also includes storing Femto Base Station information and corresponding subscriber list by the Macro Base Station. The method includes identifying the mobile device to a corresponding Femto Base Station by the Macro Base Station based on the stored Femto Base Station information and the corresponding subscriber list. Moreover, the method includes transmitting a unicast message to the mobile device by the Macro Base Station, wherein the unicast message includes the Femto Base Station information and neighboring Macro Base Station information. Furthermore, the method includes receiving a scan request by Macro Base Station from the mobile device and sending scan response by the Macro Base Station to the mobile device, wherein the scan response comprises Femto Base Station identifier and selected Macro Base Station identifiers. Further, the method includes receiving a handoff request from the mobile device and sending a handoff response to the mobile device.

Another example of a method for managing idle mode of a Femto Base Station includes transmitting periodically a subscriber list of a plurality of mobile devices to neighboring base stations by the Femto Base Station. The method also includes storing Femto Base Station information and corresponding subscriber list by the neighboring Base Stations. Further, the method includes establishing connection between the mobile device and a neighboring Base Station and identifying the home Femto Base Station of a mobile device by the neighboring base station based on the stored Femto Base Station information and the corresponding subscriber list. Moreover, the method includes notifying the home Femto Base Station of the attachment of a mobile device by the neighboring base station. Furthermore, the method includes detaching the mobile device from the neighboring base station and notifying the home Femto Base Station of the detachment of the mobile device.

An example of a system for managing a mobile device handoff from a macro base station to a femto base station includes a plurality of Femto Base Stations and a plurality of mobile devices subscribed to a Femto Base Station. The system also includes a macro base station for receiving periodically a subscriber list from each of neighboring Femto Base Stations, storing Femto Base Station information and corresponding subscriber list, establishing connection between a mobile device, identifying the mobile device to a corresponding Femto Base Station based on the stored Femto Base Station information and the corresponding subscriber list, transmitting a unicast message to the mobile device wherein the unicast message includes the Femto Base Station information and neighboring Macro Base Station information, receiving a scan request by Macro Base Station from the mobile device, sending scan response to the mobile device, wherein the scan response comprises Femto Base Station identifier and selected Macro Base Station identifiers, receiving a handoff request from the mobile device, and sending a handoff response to the mobile device. Further, the system includes a prioritizing unit for prioritizing the Femto Base Station and one or more base stations based on strength of signals.

ADVANTAGEOUS EFFECTS OF INVENTION

According to the present invention, a mobile node can perform seamless handover from macro base station to femto base station although the location of femto base station is changed.

BRIEF DESCRIPTION OF DRAWINGS

The accompanying figures, similar reference numerals may refer to identical or functionally similar elements. These reference numerals are used in the detailed description to illustrate various embodiments and to explain various aspects and advantages of the present disclosure.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present disclosure.

MODE FOR THE INVENTION

It should be observed that method steps and system components have been represented by conventional symbols in the figures, showing only specific details that are relevant for an understanding of the present disclosure. Further, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Embodiments of the present disclosure described herein provide a method and system for managing handoff sessions in mobile device.

Figure 1:
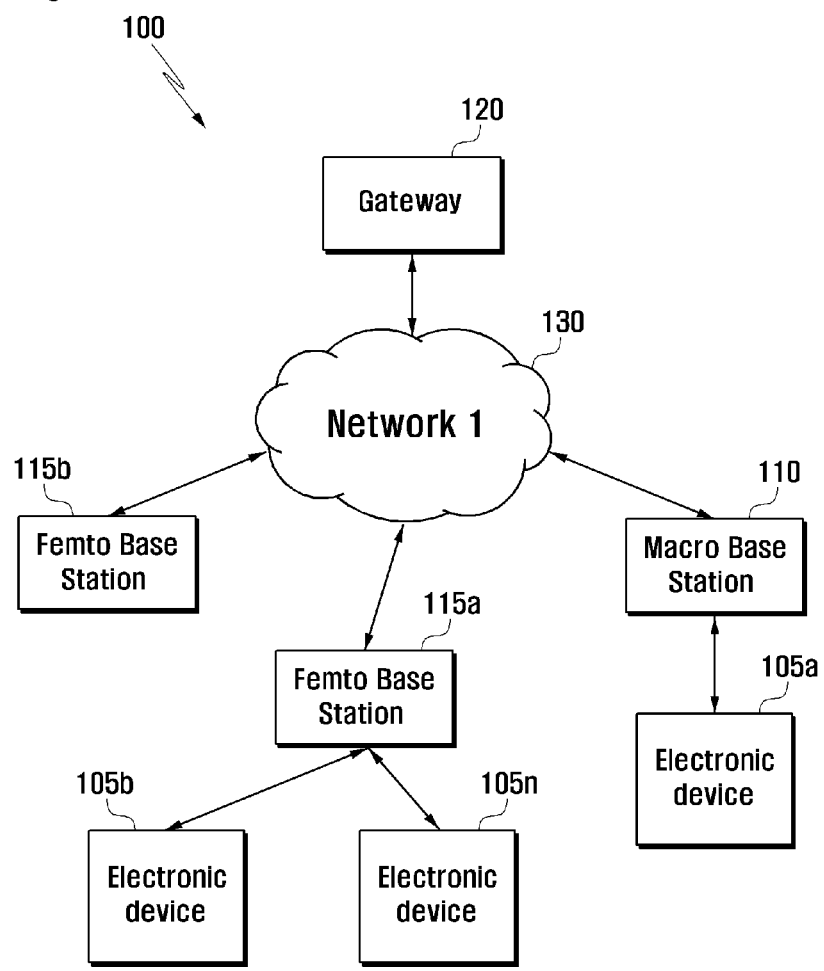
FIG. 1 is a block diagram of an environment, in accordance with which various embodiments can be implemented.

FIG. 1 is a block diagram of an environment 100, in accordance with which various embodiments can be implemented. The environment 100 includes a plurality of electronic devices, for example, an electronic device 105a, an electronic device 105b, and an electronic device 105n. Examples of the electronic device 105a include, but are not limited to, a computer, a laptop, a palmtop, a mobile, and a personal digital assistant (PDA). The electronic device 105a is connected to a Macro Base Station 110. The electronic device 105b and an electronic device 105n are subscribed to a Femto Base Station 115a.

A plurality of electronic devices can be subscribed to one or more Femto Base Station. For example, the electronic device 105b can be subscribed to the Femto Base Station 115a and a Femto Base Station 115b.

The Macro Base Station 110 is used to cover thousands of users.

The Femto Base Station 115a is a small cellular base station which is installed in a home or in an office. The Femto Base Station 115a is used to offer better service to mobile stations where network coverage is less or absent. Femto Base Station network access is through a publicly-switched telephone network, which is typically available using a Digital Subscriber Line (DSL) or cable connection. In normal scenarios, the Femto Base Station 115a covers an indoor coverage of about 50 meters.

The Macro Base Station 110 and the plurality of Femto Base Station, Femto Base Station 115a and Femto Base Station 115b are connected to a Gateway 120 through a network 130. Examples of the network 130 include but are not limited to interne protocol multimedia subsystem (IMS) network and session initiation protocol (SIP) based network.

The Gateway 120 is a computer or a network that allows or controls access to another computer or network, for example, an access service network gateway (ASN-GW). The Femto Base Station 115a and the Femto Base Station 115b obtains information about neighboring base stations from the Gateway 120.

The electronic device 105b communicates to the Femto Base Station 115a when the user of the electronic device 105b is at home. The user is completely offloaded from the Macro Base Station 110. The Femto Base Station 115a provides access to service providers network. When the user is away from home, the electronic device 105b would be connected to the Macro Base Station 110 to access the service providers network.

Figure 2:
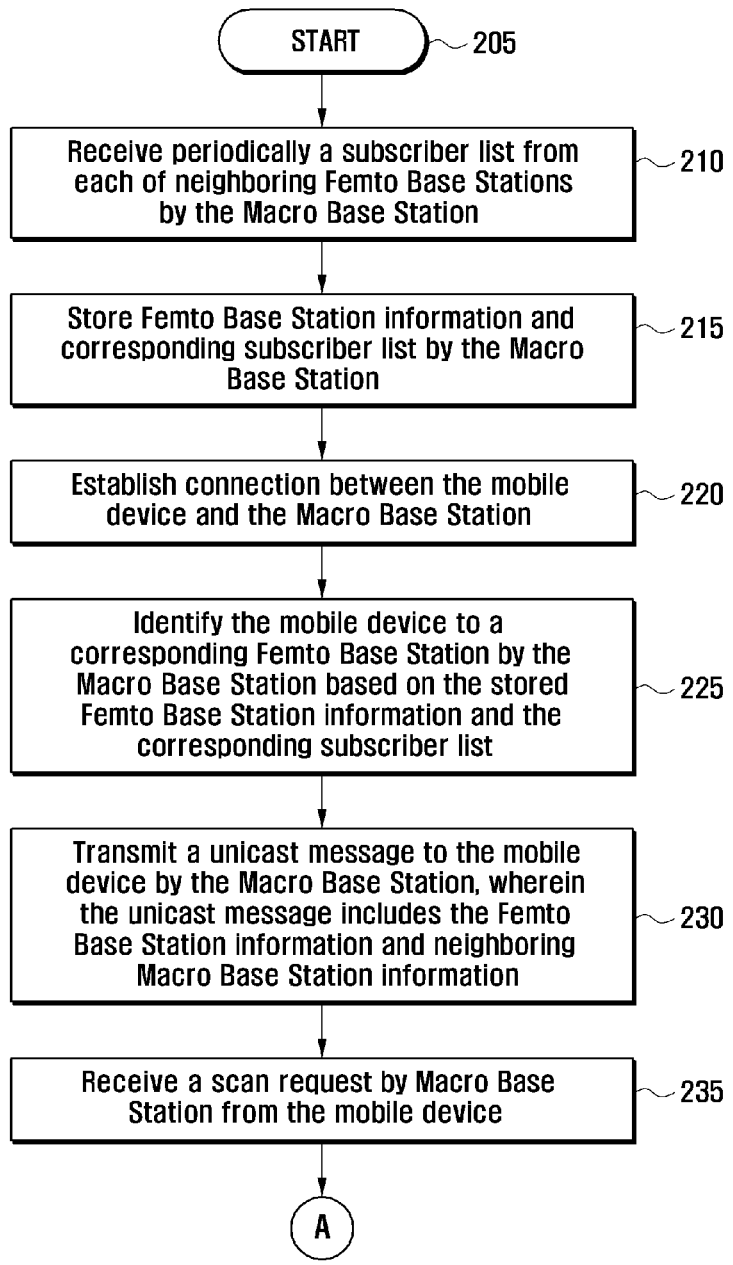
FIG. 2 and FIG. 3 depicts a flowchart illustrating a method for managing a mobile device handoff from a macro base station to a femto base station, in accordance with one embodiment.
Figure 3:
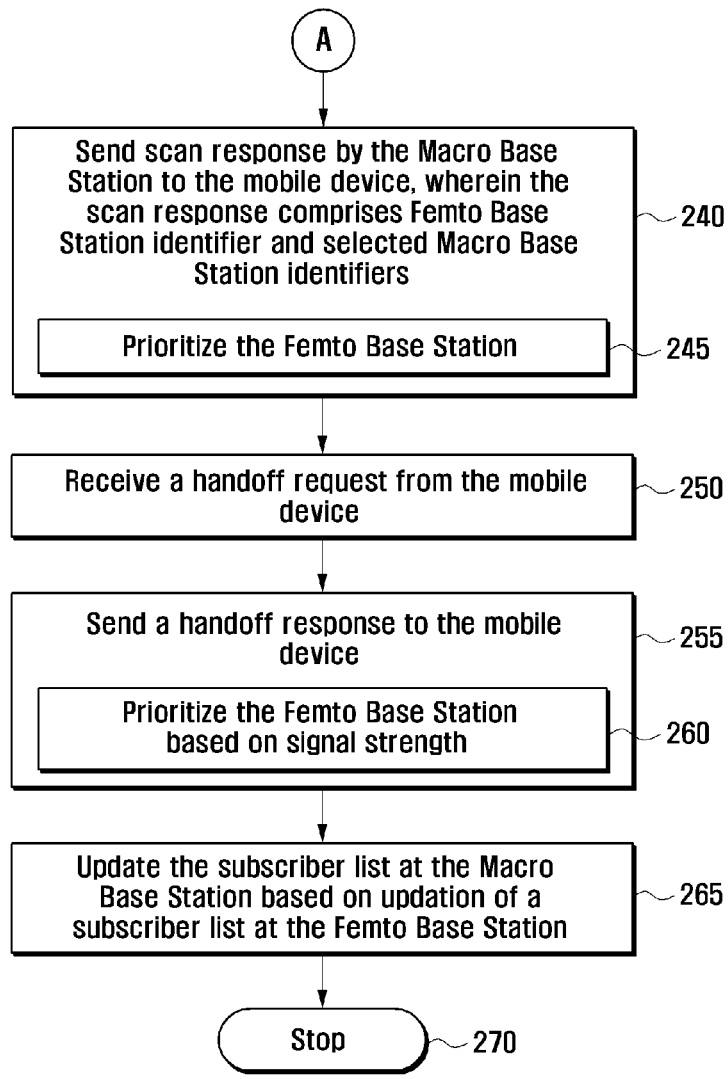

FIG. 2 and FIG. 3 depicts a flowchart illustrating a method for managing a mobile device handoff from a macro base station to a femto base station, in accordance with one embodiment.

The method starts at step 205.

At step 210, a subscriber list is received periodically from each of neighboring Femto Base Stations by the Macro Base Station. The subscriber list includes a plurality of mobile nodes which are subscribed to a particular Femto Base Station.

It will be appreciated that the subscriber list also includes details of Femto Base station such as its identifier, RF and PHY details.

When a Femto Base Station is installed in a users home or office, the Femto Base Station is configured with a set of authorized user or also termed as subscribers of that particular Femto Base Station. In normal scenarios, four to six users can be subscribed to a particular Femto Base Station.

At step 215, the Femto Base Station information and corresponding subscriber list is stored in a database by the Macro Base Station. The Macro Base Station stores the subscriber list received from each of the neighboring Femto Base Stations.

Further, if the subscriber list is not received periodically then, any refreshing mechanism, for example, aging mechanism, is used to delete invalid entries.

At step 220, a connection is established between the mobile device and the Macro Base Station. The mobile device attaches to the Macro Base Station.

At step 225, the corresponding Femto Base Station of the mobile device is identified by the Macro Base Station based on the stored Femto Base Station information and the corresponding subscriber list.

At step 230, a unicast message is transmitted to a mobile device by the Macro Base Station. The unicast message is transmitted periodically and includes information of the Femto Base Station and information of other neighboring Macro Base Stations.

A configuration change count of the unicast message is higher than a configuration change count of broadcast message for the mobile node to accept the unicast message, else the unicast message is discarded.

At step 235, a scan request is received by Macro Base Station from the mobile device. The scan request is received from the mobile device when it wants to do scanning. The mobile device requests for scanning intervals of selected neighboring Macro Base Stations and the Femto Base Station.

At step 240, a scan response is sent by the Macro Base Station to the mobile device. The scan response includes the Femto Base Station identifier and the selected Macro Base Station identifiers.

At step 245, the Femto Base Station is prioritized in the scan response.

At step 250, a handoff request is received from the mobile device. The mobile device decides which neighboring Base Stations are suitable for handoff.

At step 255, a handoff response is sent to the mobile device. The response can include suggestions from the Macro Base Station to connect to the Femto Base Station if the signal strength from Femto Base Station is good.

At step 260, the Femto Base Station is prioritized based on signal strength.

At step 265, the subscriber list is updated at the Macro Base Station based on updation of a subscriber list at the Femto Base Station.

The method ends at step 270.

Figure 4:
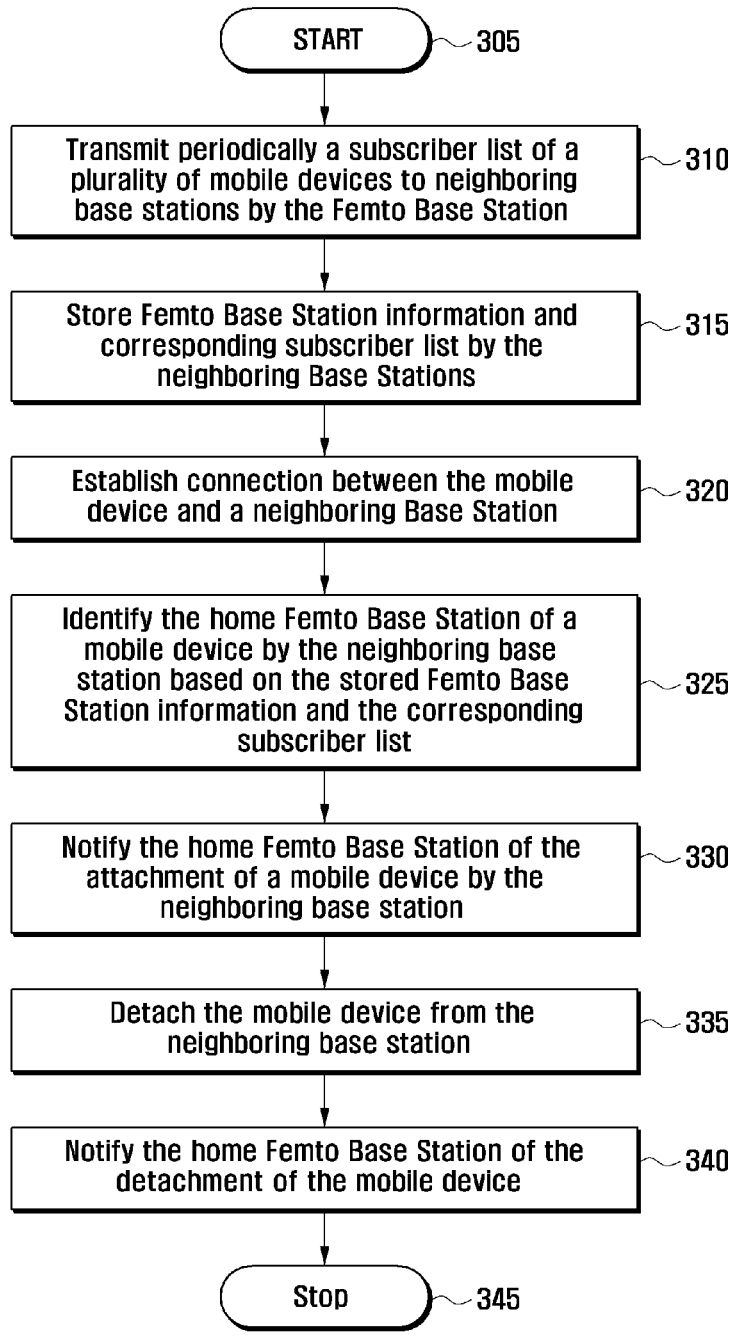
FIG. 4 is a flowchart illustrating a method for managing idle mode of a Femto Base Station, in accordance with another embodiment.

FIG. 4 is a flowchart illustrating a method for managing idle mode of a Femto Base Station, in accordance with another embodiment.

The method starts at step 305.

At step 310, a subscriber list is periodically transmitted to neighboring base stations by the Femto Base Station. The subscriber list includes a plurality of mobile nodes which are subscribed to a particular Femto Base Station.

Further a plurality of subscriber lists corresponding to a plurality of Femto Base Stations can be received by the Base Station.

At step 315, the Femto Base Station information and corresponding subscriber list is stored in a database by the neighboring Base Station. The Base Station stores the subscriber list received from each of the neighboring Femto Base Stations.

Further, if the subscriber list is not received periodically then, any refreshing mechanism, for example, aging mechanism, is used to delete invalid entries At step 320, a connection is established between the mobile device and the neighboring Base Station. The mobile device attaches to the neighboring Base Station.

At step 325, the corresponding Femto Base Station of the mobile device is identified by the neighboring Base Station based on the stored Femto Base Station information and the corresponding subscriber list.

At step 330, the home Femto Base Station is notified of the attachment of a mobile device by the neighboring Base Station. A home Femto Base Station is the Femto Base Station that the mobile device is subscribed.

The neighboring Base Station can be a Macro Base Station, A Pico Base Station or a Femto Base Station.

At step 335, the mobile device is detached from the neighboring Base station.

At step 340, the home Femto Base Station is notified of the detachment of the mobile device by the neighboring Base Station.

The Femto Base Station is now aware of the presence of the mobile devices that are subscribed in the coverage area and its neighbor's coverage area. If none of the subscribed mobile devices are present in its coverage area or in its neighbor's coverage area, the Femto Base Station stops downlink transmission and goes into an idle mode. Further, if the Femto Base Station is notified of the attachment of any of its subscribers to its neighbor Base Station, the downlink transmission resumes.

The method ends at step 345.

Figure 5:
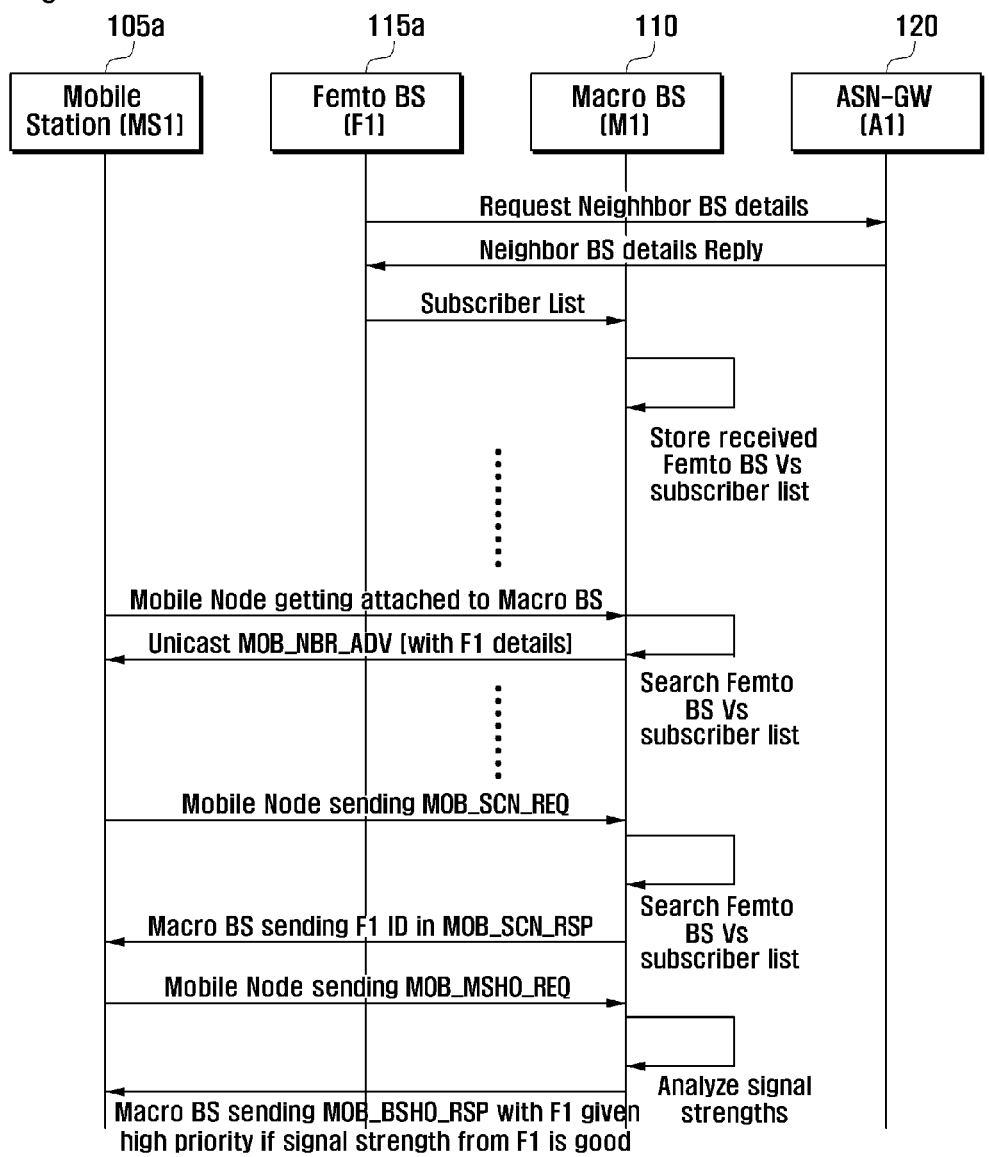
FIG. 5 is a schematic representation of dataflow for managing a mobile device handoff from a macro base station to a femto base station, in accordance with one embodiment.

FIG. 5 is a schematic representation of dataflow for managing handoff sessions, in accordance with one embodiment.

A Femto Base Station 115a sends a request to the Access Service Network Gateway 120 for obtaining information of neighboring Base Stations.

The Access Service Network Gateway 120 replies to the Femto Base Station 115a with corresponding neighboring Base Stations.

The Femto Base Station 115a sends a subscriber list to a Macro Base Station 110. The subscriber list includes details of the Femto Base Station 115a and of the corresponding Base Stations.

The Macro Base Station 110 stores the subscriber list in a database.

The mobile station 105a attaches to the Macro Base Station 110.

The Macro Base Station 110 searches the mobile station 105a with a corresponding subscribed Femto Base Station 115a.

The Macro Base Station 110 unicasts a message with details of the Femto Base Station 115a.

The mobile station 105a sends a scan request, MOB_SCN_REQ to scan for the intervals of the Femto Base Station 115a.

The Macro Base Station 110 searches for the Femto Base Station 115a identifier.

The Macro Base Station 110 sends the identifier of the Femto Base Station 115a to the mobile station 105a. Further, the mobile station 105a scans Femto Base Station 115a and other Macro Base Stations to get signal strength and service availability.

The mobile station 105a sends a MOB_MSHO_REQ to request for a handoff to a neighboring base station.

The Macro Base Station 110 sends a MOB_MSHO_RES to the mobile station 105a.

Figure 6:
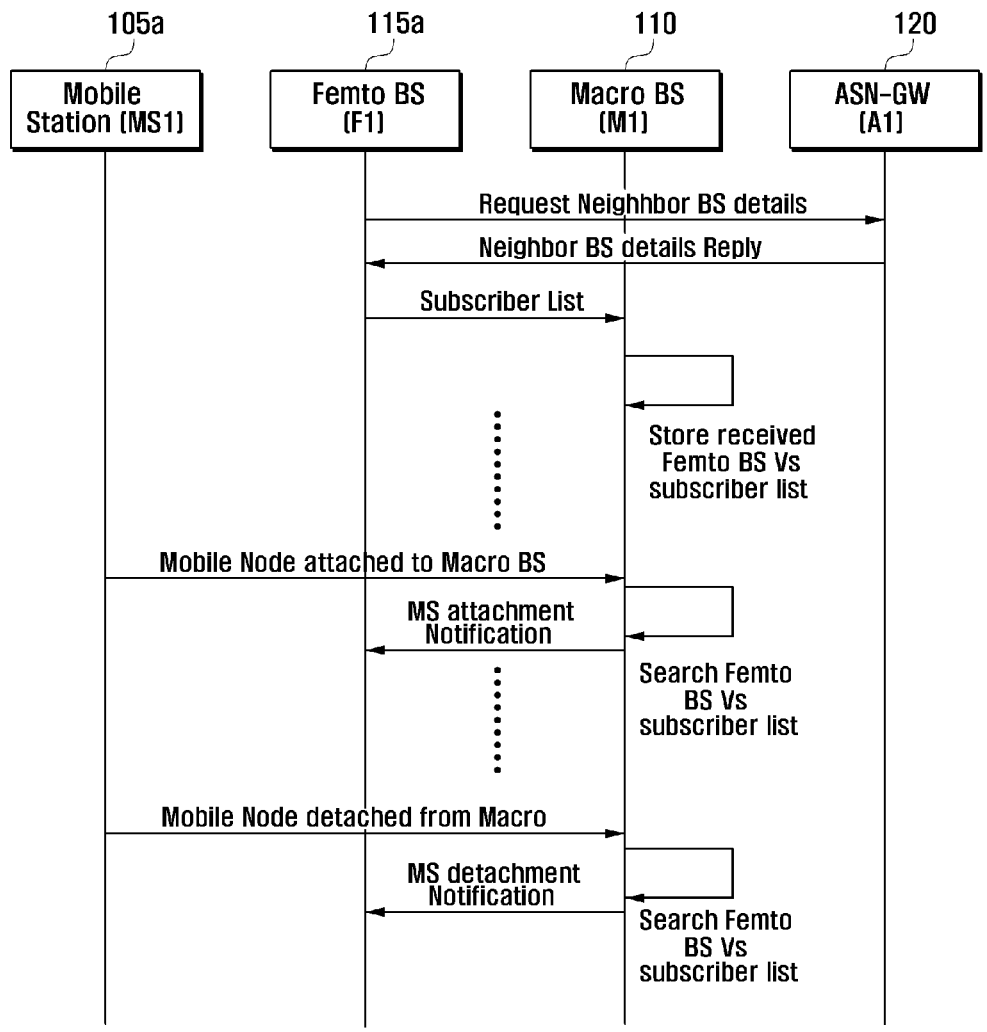
FIG. 6 is a schematic representation of dataflow for managing idle mode of a Femto Base Station, in accordance with another embodiment, in accordance with another embodiment.

FIG. 6 is a schematic representation of dataflow for managing idle mode of Femto Base Station, in accordance with another embodiment.

A Femto Base Station 115a sends a request to the Access Service Network Gateway 120 for obtaining information of neighboring Base Stations.

The Access Service Network Gateway 120 replies to the Femto Base Station 115a with corresponding neighboring Base Stations. The neighboring Base Stations includes a Femto Base Station 115a and the Macro Base Station 110.

The Femto Base Station 115a sends a subscriber list to a Macro Base Station 110. The subscriber list includes details of the Femto Base Station 115a and of the corresponding Base Stations.

The Macro Base Station 110 stores the subscriber list in a database.

The mobile station 105a attaches to the Macro Base Station 110.

The Macro Base Station 110 searches the mobile station 105a with a corresponding subscribed Femto Base Station 115a.

The Macro Base Station 110 notifies the Femto Base Station 115a that the mobile station 105a is attached.

In another scenario, the mobile station 105a detaches from the Macro Base Station 110.

The Macro Base Station 110 searches for the Femto Base Station 115a identifier.

The Macro Base Station 110 sends a notification to the Femto Base Station 115a that the mobile station 105a is detached.

In some embodiments, one or more steps can be implemented using a computer system. The computer system includes a processor coupled with a bus for processing information. The computer system can also include a main memory, such as a random access memory (RAM) or other dynamic storage device, coupled to the bus for storing information required by the processor. The main memory can be used for storing temporary variables or other intermediate information required by the processor. The computer system can also include a read only memory (ROM) or other static storage device coupled to the bus for storing static information for the processor. A storage device, such as a magnetic disk or optical disk, can also be provided and coupled to the bus for storing information. The computer system can be coupled via the bus to a display such as a cathode ray tube (CRT), a liquid crystal display (LCD) or a light emitting diode (LED) display, and an input device for communicating information and command selections to the processor. The input device can also be included in the display, for example a touch screen.

In one embodiment, the techniques are performed by the processor using information included in the main memory. The information can be read into the main memory from another machine-readable medium, such as the storage unit.

The term "machine-readable medium" as used herein refers to any medium that participates in providing data that causes a machine to operate in a specific fashion. In an embodiment implemented using the computer system, various machine-readable medium are involved, for example, in providing information to the processor. The machine-readable medium can be a storage media. Storage media includes both non-volatile media and volatile media. Non-volatile media includes, for example, optical or magnetic disks, such as the storage unit. Volatile media includes dynamic memory, such as the memory. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge.

In another embodiment, the machine-readable medium can be a transmission media including coaxial cables, copper wire and fiber optics, including the wires that include the bus. Transmission media can also take the form of acoustic or light waves, such as those generated during radio-wave and infrared data communications.

The computer system also includes a communication interface coupled to the bus. The communication interface provides a two-way data communication coupling to the network. For example, the communication interface can be a local area network (LAN) card to provide a data communication connection to a compatible LAN. Wireless links can also be implemented. In any such implementation, communication interface sends and receives electrical, electromagnetic or optical signals that carry digital data streams representing various types of information. The communication interface can be a universal serial bus port.

In the preceding specification, the present disclosure and its advantages have been described with reference to specific embodiments. However, it will be apparent to a person ordinary skilled in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

The invention claimed is:

1. A method for managing a mobile device handoff from a Macro Base station to a Femto Base Station, the method comprising:
   receiving periodically a subscriber list from each of neighboring Femto Base Stations by the Macro Base Station;
   storing Femto Base Station information and corresponding subscriber list by the Macro Base Station;
   establishing a connection between the mobile device and the Macro Base Station;
   identifying the mobile device to a corresponding Femto Base Station by the Macro Base Station based on the stored Femto Base Station information and the corresponding subscriber list;
   transmitting a unicast message to the mobile device by the Macro Base Station, wherein the unicast message includes the Femto Base Station information and neighboring Macro Base Station information;
   receiving a scan request by Macro Base Station from the mobile device;
   sending a scan response by the Macro Base Station to the mobile device, wherein the scan response comprises Femto Base Station identifier and selected Macro Base Station identifiers;
   receiving a handoff request from the mobile device; and
   sending a handoff response to the mobile device.

2. The method of claim 1, wherein the sending the scan response by the Macro Base Station comprises:
   prioritizing the Femto Base Station.

3. The method of claim 1, wherein the sending of the handoff response to the mobile device comprises:
   prioritizing the Femto Base Station based on signal strength.

4. The method of claim 1 further comprising:
   updating the subscriber list at the Macro Base Station based on update of a subscriber list at the Femto Base Station.

5. A method for managing idle mode of a Femto Base Station, the method comprising:
   transmitting periodically a subscriber list of a plurality of mobile devices to neighboring base stations by the Femto Base Station;
   storing Femto Base Station information and corresponding subscriber list by the neighboring Base Stations;
   establishing a connection between the mobile device and a neighboring Base Station;
   identifying the home Femto Base Station of a mobile device by the neighboring base station based on the stored Femto Base Station information and the corresponding subscriber list;
   notifying the home Femto Base Station of the attachment of a mobile device by the neighboring base station;
   detaching the mobile device from the neighboring base station; and
   notifying the home Femto Base Station of the detachment of the mobile device.

6. A system for managing a mobile device handoff from a Macro Base station to a Femto Base Station, the system comprising:
   a plurality of Femto Base Stations;
   a plurality of mobile devices subscribed a Femto Base Station;
   a macro base station for performing:

receiving periodically a subscriber list from each of neighboring Femto Base Stations, storing Femto Base Station information and corresponding subscriber list, establishing a connection between a mobile device, identifying the mobile device to a corresponding Femto Base Station based on the stored Femto Base Station information and the corresponding subscriber list, transmitting a unicast message to the mobile device wherein the unicast message includes the Femto Base Station information and neighboring Macro Base Station information, receiving a scan request by Macro Base Station from the mobile device, sending a scan response to the mobile device, wherein the scan response comprises Femto Base Station identifier and selected Macro Base Station identifiers, receiving a handoff request from the mobile device, and sending a handoff response to the mobile device; and a prioritizing unit for prioritizing the Femto Base Station and one or more base stations based on strength of signals.

\* \* \* \* \*